Patented Dec. 5, 1939

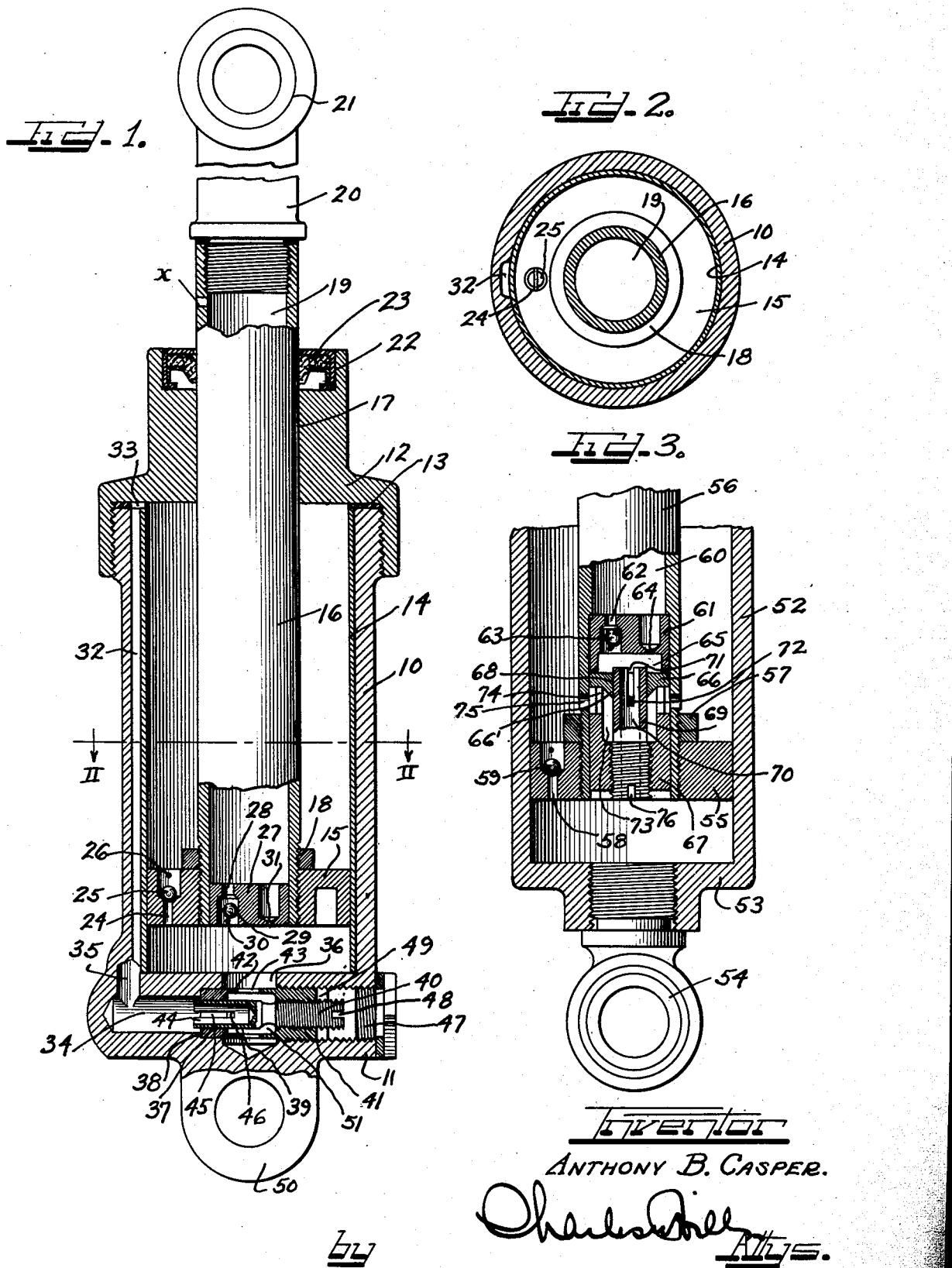

2,182,581

UNITED STATES PATENT OFFICE 2,182,581

HYDRAULIC SHOCK ABSORBER

Anthony B. Casper, Buffalo, N. Y., assignor to Houde Engineering Corporation, Buffalo, N. Y., a corporation of New York Application March 15, 1937, Serial No. 130,850

5 Claims. (Cl. 188—88)

This invention relates to direct acting hydraulic shock absorbers, particularly to that type in which the piston rod is hollow to provide a reservoir for hydraulic fluid, the important object of the invention being to provide improved valving means and arrangement for controlling the flow of the displaced hydraulic fluid from one side of the piston to the other and into and out of the reservoir.

The various features of my invention will become apparent from the following specification, taken in connection with the drawing, in which drawing:

Figure 1 is a vertical diametrical section of a shock absorber;

Figure 2 is a section on plane II—II of Figure 1; and

Figure 3 is a longitudinal diametrical section of the inner end of a shock absorber, showing a modified valving arrangement.

In the structure of Figures 1 and 2, the cylinder 10 has the head 11 at its inner end, and the cylinder and its head may be an integral casting. The outer head 12 is detachable and is secured in place by threading engagement with the cylinder end, a gasket or washer 13 being preferably interposed to prevent leakage. The cylinder is lined by a length of tubing 14 forming smooth engagement for a piston 15 from which the piston rod 16 extends outwardly through the bore 17 of the head 12. The piston is secured by threading onto the inner end of the piston rod and clamped by a lock nut 18. The piston rod is hollow to provide reservoir space 19 for hydraulic fluid, and a fitting 20 threads into the outer end of the piston rod and terminates in an eye 21 by means of which the piston structure may be secured to a support such as the chassis of an automobile with the springs of which the shock absorber is to be associated. The outer end of the head 12 has the recess 22 for receiving a suitable packing assembly 23 for preventing leakage of hydraulic fluid along the piston rod to the exterior of the shock absorber.

The piston has the port 24 therethrough controlled by a check valve such as a ball 25, the ball being retained in the passageway by a cross pin 26. The arrangement is such that the ball will close the passageway 24 during outward movement of the piston in the cylinder, but will expose this passageway for fluid flow during inward movement of the piston. In the inner end of the piston rod is secured a cross wall 27 having the passageway 28 controlled by a check valve such as a ball 29 held in the passageway by a cross pin 30. The arrangement is such that the ball will close the passageway 28 during inward movement of the piston, but will expose the passageway during outward movement of the piston. The wall 27 has also a restricted orifice 31 for controlling fluid flow into the reservoir 19 during inward movement of the piston.

The cylinder wall 10 has a longitudinally extending channel 32 along one side thereof, the inner side of which is closed by the lining tube 14, the channel at its outer end being connected with the outer end of the cylinder by a passage 33.

The cylinder head 11 has the cross bore 34 having connection at its inner end with the channel 32 through the passageway 35. Intermediate its ends the cross bore is intersected by the axially extending passage 36 communicating with the inner end of the cylinder. Adjacent to the inner side of the passageway or space 36 a bushing 37 is seated in the bore 34 against a shoulder 38, the bushing forming a seat for the inner end of a cylindrical valve plug 39. The valve plug has a threaded outer end 40 for threading through the head 41 of a sleeve 42 in the bore 34, the head 41 having threaded engagement with the threaded outer end of the bore. The sleeve 42 abuts the valve seat bushing 37 and surrounds the outer end of the valve 39 at the space 36, and is provided with ports 43 communicating with this space.

The valve 39 has the bore 44, the valve wall around the bore having one or more longitudinal slits 45 cooperating with the outer end of the bushing 37 to define orifice passageways 46, the size of the orifice passageways depending upon the distance of the inner ends of the slits from the outer end of the bushing.

The outer end of the bore is closable by a threaded plug 47 which, when removed, permits ready access to the valve threaded end in the threaded sleeve head 41 for adjustment of the inner ends of the slits relative to the outer end of the bushing 37 for the desired size of orifice, the valve end being provided with a cross slot 48 for a screwdriver or other tool for turning the valve. The sleeve head 41 may also have a tool-receiving slot 49 so that it may be readily screwed into the bore 34 for abutment against the bushing 37.

The head 11 has the eye 50 extending therefrom for securing of the cylinder structure to a support such as the axle of the automotive vehicle.

Describing now the operation, during compression movement of the vehicle spring with which the shock absorber is associated, and inward movement of the piston in the cylinder, fluid displaced from the inner end of the cylinder will flow through the passageway 24 past the check valve 25 into the outer end of the cylinder. Owing to the volumetric differential at opposite sides of the piston on account of the volume of the piston rod, the outer end of the cylinder cannot accommodate all of the fluid displaced from the inner end thereof, and the surplus fluid will therefore flow into the reservoir space 19 within the piston rod by way of the orifice 31, the passage 28 being then closed by the check valve 29. The orifice 31 will meter the surplus fluid flow and will determine the shock absorbing resistance of the shock absorber during the vehicle spring compression movement.

The reservoir space 19 above the fluid level therein may be entirely enclosed and contain air so that during flow of fluid into the reservoir through the orifice 31, the air will be compressed and form a resilient cushion for assisting in checking the piston movement. If no air cushion is desired, a vent X open to the atmosphere may be provided at the upper end of the reservoir for outflow or inflow of air as the fluid level in the reservoir changes. The orifice 31 would then alone determine the shock absorbing resistance during vehicle spring compression movement.

During rebound movement of the vehicle spring and outward movement of the piston in the cylinder, the passageway 24 will be closed by the check valve 25, and the fluid displaced from the outer end of the cylinder will flow through the passage 33, channel 32, and passage 35, through the bore 34 and the bore 44 of the valve 39, and through the restricted orifice passage 46 into the space 51 between the sleeve 42 and the valve, and then through port 43 into the head space 36 and to the inner end of the cylinder, the orifice 46 metering this flow. On account of the volumetric differential on opposite sides of the piston, there will be suction in the lower end of the cylinder as the piston moves outwardly, but this suction will be relieved by the free flow of fluid from the reservoir 19 through the passageway 28 into the lower end of the cylinder.

In the modified arrangement shown in Figure 3, the cylinder 52 has the inner end wall 53 integral therewith, an eye fitting 54 being threaded into the end wall for securing the cylinder structure to a support. The piston 55 is threaded onto the inner end of the piston rod 56 and clamped by a lock nut 57. The piston has the passageway 58 therethrough controlled by the check valve 59, which permits flow through the passage during inward movement of the piston, but checks flow therethrough in the opposite direction. The piston rod is hollow to provide reservoir space 60 for hydraulic fluid, which space is either closed, or vented at its upper end to atmosphere through a vent X, such as is shown in Figure 1. A cross wall 61 is seated in the piston rod a distance inwardly from the end thereof and has the passage 62 controlled by a check valve 63, the wall having also the orifice 64 therethrough.

The cross wall 61 has the recess 65 in its outer end and against the outer end of the wall a valve seat bushing 66 seats and is held in place by a bushing 67 abutting the outer side thereof. The seat disk 66 has the cylindrical passageway 68 for the inner end of a valve 69 the outer end of which has threaded engagement in the bushing 67. The valve 69 has the bore 70 therethrough, and at its inner end the valve wall has the longitudinal slits 71 cooperating with the outer side of the disk 66 to define orifice passageways 72, the size of the orifice passageway depending upon the distance between the inner ends of the slits and the outer side of the disk 66, the disk having preferably the beveled sharp edge boss 66' on its lower side for presenting a sharp edge to the ends of the slits.

The inner end of the bushing 67 has the bore or recess 73 and has ports 74 communicating with the ports 75 in the piston rod to connect the recess 73 with the cylinder above the piston.

Describing now the operation, during compression movement of the vehicle spring and inward movement of the piston, fluid displaced from the inner end of the cylinder will flow through the passage 58 past the check valve 59 to the outer end of the cylinder, the surplus flow resulting from the volume differential flowing through the bore 70 of the valve 69 into the recess 65 and from there through the orifice 64 into the reservoir 60 within the piston rod.

During rebound movement of the vehicle spring and outward movement of the piston, the valve 59 closes the passageway 58 through the piston and the fluid displaced from the outer end of the cylinder will flow through ports 75 and 74 into the space 73 and from there through the orifice passage 72 and the bore 70 of the valve to the inner end of the cylinder, the orifice passage metering this flow. Any suction in the lower end of the cylinder during outward travel of the piston will be relieved by the free flow of fluid from the reservoir 60 through the passage 62 and through the valve bore to the inner end of the cylinder.

By unscrewing the eye fitting 54 from the cylinder end, a suitable tool may be applied in the cross slot 76 in the outer end of the valve 69 for turning the threaded valve for axial adjustment thereof relative to the seat disk 66 for the desired size of the metering orifice passage 72.

I have shown practical and efficient embodiments of the features of my invention, but I do not desire to be limited to the exact construction, arrangement, and operation shown and described, as changes and modifications may be made without departing from the scope of the invention.

I claim as my invention:

1. In a direct acting hydraulic shock absorber, a cylinder structure, a piston in said cylinder structure having a piston rod extending therefrom, said piston rod being hollow to provide hydraulic fluid reservoir space, a fluid passageway through the piston and a check valve closing said passageway during outward movement of the piston in the cylinder structure, a cross wall in the inner end of the piston rod having an orifice therethrough and a passageway, a check valve permitting flow through said cross wall passageway during outward movement of the piston but closing said cross wall passageway against flow during inward movement of the piston, a channel extending through the cylinder structure for connecting the outer end of the cylinder with the inner end thereof, and a metering valve interposed in said channel for metering the flow during outward movement of the piston in the cylinder structure.

2. In a direct acting hydraulic shock absorber, a cylinder having inner and outer end closures, a piston within the cylinder and a piston rod extending therefrom through the outer end closure, said piston rod having a bore terminating at its inner end and the outer portion of said bore providing hydraulic fluid reservoir space, a bushing in the inner end of said bore, a valve seat wall in said bore outwardly of said bushing, a valve having threaded engagement with said bushing and cooperable with said seat wall to define a restricted orifice passage, said valve having a passageway communicating with said orifice and the inner end of the cylinder, ports connecting the space between said bushing and seat wall with the cylinder at the outer side of the piston whereby fluid may flow from one side of the piston to the other under control of said orifice when said piston reciprocates in said cylinder, said valve by its threaded engagement in said bushing being adjustable for increasing or decreasing the size of the orifice passage.

3. In a direct acting hydraulic shock absorber, a cylinder, a piston operable in said cylinder and having a piston rod extending therefrom through one end of the cylinder, the piston rod being hollow and the outer portion thereof forming a reservoir space for hydraulic fluid, a closure wall for the inner end of said piston rod, a hollow valve plug having threaded engagement with said closure wall and extending longitudinally outwardly in the piston rod space, a seat wall within the piston rod outwardly of said closure wall, said seat wall having a bore in which the outer end of the valve plug seats, passages connecting the space between said closure wall and seat wall with the cylinder at the outer side of the piston, said valve having a port cooperable with the inner end of the seat wall to define a restricted orifice passage for metering the fluid flow through said hollow valve from one side of the piston to the other during reciprocation of the piston, a cross wall in said piston rod outwardly of said seat wall and having a passageway therethrough for flow of hydraulic fluid into or out of the reservoir space during reciprocation of the piston, said valve by its threaded engagement being axially adjustable for increasing or decreasing the size of the orifice passage.

4. In a direct acting hydraulic shock absorber, a cylinder closed at its ends, a piston reciprocable in said cylinder and having a piston rod extending therefrom through an end closure of the cylinder, said piston having a fluid passageway therethrough and a check valve opening said passage during inward movement of the piston and closing said passage during outward movement of the piston, said piston rod having a bore the outer portion of which provides a reservoir space for hydraulic fluid, a closure wall for the inner end of said bore, a seat wall in said bore outwardly of said closure wall, ports connecting the space between said walls with the cylinder at the outer side of the piston, a valve plug supported in said closure wall and cooperable with said seat wall to define a fluid flow metering passage, said valve having a passageway running longitudinally therethrough and said orifice passage connecting said valve passage with the space between said closure wall and seat wall whereby displaced fluid flow during reciprocation of the piston will be metered by said orifice passage, a cross wall in the piston rod bore outwardly of said seat wall, said cross wall having a restricted passageway for the flow of surplus hydraulic fluid from the inner end of the cylinder through the valve passageway and into the reservoir space during inward movement of the piston, and said cross wall having a check valve controlled passage for freer flow of fluid from the reservoir space through the valve passageway and to the inner end of the cylinder during outward movement of the piston.

5. In a shock absorber of the class described, a cylinder structure, a piston structure comprising a piston and a piston rod extending therefrom, said piston rod being bored at its inner end, a closure wall for the inner end of said bore, a valve seat within said bore outwardly of said closure, a valve plug extending through said closure and adjustable thereon for cooperation with said valve seat to define a restricted fluid flow passage, said valve plug having a channel therethrough between the restricted passage and the inner end of the cylinder, and means providing a passageway for the flow of displaced fluid from one side of the piston to the other during relative movement of said cylinder and piston structures, said passageway including said restricted passage and the valve channel.

ANTHONY B. CASPER.